(12) United States Patent
Bose et al.

(10) Patent No.: US 9,740,497 B2
(45) Date of Patent: *Aug. 22, 2017

(54) PROCESSOR WITH MEMORY-EMBEDDED PIPELINE FOR TABLE-DRIVEN COMPUTATION

(71) Applicant: International Business Machines Corporation, Armonk, NY (US)

(72) Inventors: Pradip Bose, Yorktown Heights, NY (US); Alper Buyuktosunoglu, White Plains, NY (US); Xiaochen Guo, Rochester, NY (US); Hillery C. Hunter, Chappaqua, NY (US); Jude A. Rivers, Cortlandt Manorm, NY (US); Vijayalakshmi Srinivasan, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 529 days.

This patent is subject to a terminal disclaimer.

(21) Appl. No.: 14/053,978

(22) Filed: Oct. 15, 2013

(65) Prior Publication Data

US 2015/0074356 A1  Mar. 12, 2015

Related U.S. Application Data

(63) Continuation of application No. 14/019,763, filed on Sep. 6, 2013.

(51) Int. Cl.
*G06F 9/38* (2006.01)

(52) U.S. Cl.
CPC .......... *G06F 9/3867* (2013.01); *G06F 9/3808* (2013.01); *G06F 9/3832* (2013.01)

(58) Field of Classification Search
CPC ..... G06F 9/3867; G06F 9/3808; G06F 9/3832
See application file for complete search history.

(56) References Cited

U.S. PATENT DOCUMENTS

| 5,845,103 | A | 12/1998 | Sodani et al. | |
|---|---|---|---|---|
| 6,625,725 | B1 * | 9/2003 | Wu | G06F 9/30076 712/228 |
| 6,894,392 | B1 * | 5/2005 | Gudesen | G11C 5/02 257/759 |
| 8,055,885 | B2 | 11/2011 | Nakashima | |
| 2008/0235674 | A1 * | 9/2008 | Gao | G06F 8/4441 717/141 |

(Continued)

OTHER PUBLICATIONS

Richardson, "Caching Function Results: Faster Arithmetic by Avoiding Unnecessary Computation", 1992, Sun Microsystems Laboratories, technical report, pp. 1-20.*

(Continued)

*Primary Examiner* — Yuqing Xiao
(74) *Attorney, Agent, or Firm* — Cantor Colburn LLP

(57) ABSTRACT

A processor and a method implemented by the processor to obtain computation results are described. The processor includes a unified reuse table embedded in a processor pipeline, the unified reuse table including a plurality of entries, each entry of the plurality of entries corresponding with a computation instruction or a set of computation instructions. The processor also includes a functional unit to perform a computation based on a corresponding instruction.

13 Claims, 12 Drawing Sheets

(56) References Cited

U.S. PATENT DOCUMENTS

2012/0054421 A1* 3/2012 Hiratsuka .......... G06F 12/0246
  711/103

OTHER PUBLICATIONS

Citron et al., "Accelerating Multi-Media Processing by Implementing Memoing in Multiplication and Division Units", ASPLOS VIII, 1995, pp. 1-10.
Connors et al., "Hardware Support for Dynamic Activation of Compiler-Directed Computation Reuse", ASPLOS, 2000, pp. 1-12.
da Costa et al., "The Dynamic Trace Memoization Reuse Technique", IEEE, 2000, pp. 1-8.
Gonzalez et al., "Trace-Level Reuse", ICPP, 1999, pp. 1-8.
Huang et al., "Exploiting Basic Block Value Locality with Block Reuse", HPCA, 1999, pp. 1-9.
Long et al., "Minimal Multi-Threading: Finding and Removing Redundant Instructions in Multi-Threaded Processors", Micro, 2010, pp. 1-12.
Sodani et al., "Dynamic Instruction Reuse", Proceedings of the 24th International Symposium on Computer Architecture (ISCA), Jun. 1997, pp. 1-12.
Richardson, Stephen E. "Caching Function Results: Faster Arithmetic by Avoiding Unnecessary Computation", Sun Microsystems Laboratories, Technical Report, 1992, pp. 1-20.

* cited by examiner

PROCESSOR WITH MEMORY-EMBEDDED PIPELINE FOR TABLE-DRIVEN COMPUTATION

CROSS-REFERENCE TO RELATED APPLICATION

This application is a continuation of U.S. application Ser. No. 14/019,763 filed Sep. 6, 2013, the disclosure of which is incorporated by reference herein in its entirety.

BACKGROUND

The present invention relates to computations, and more specifically, to obtaining computation results in multicore processors. Because multicore processors (e.g., in integrated circuits) operate on a fixed power budget, only a small fraction of all the cores may be active at a given time. As such, computational speeds attainable with combinational logic elements that may be used in current processor pipelines may be limited.

SUMMARY

According to one embodiment of the present invention, a processor includes a unified reuse table embedded in a processor pipeline, the unified reuse table including a plurality of entries, each entry of the plurality of entries corresponding with a computation instruction or a set of computation instructions; and a functional unit configured to perform a computation based on a corresponding instruction.

According to another embodiment of the invention, a method implemented by a processor to obtain computation results includes storing, in a unified reuse table, a plurality of the entries, each entry of the plurality of the entries corresponding with a computation instruction or a set of computation instructions; performing a computation, using a functional unit, based on a corresponding instruction; and obtaining a result associated with an input based on either or both of the unified reuse table and the functional unit.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, obtaining computation results through logic elements or functional units (execution units) may be a limiting factor in the scalability of multicore processors. Cache memories may be used to exploit the spatial and temporal locality of instructions and data in program execution, but the computation engine itself does not exploit historical information such as, for example, the fact that the same arithmetic operands were used in the same computation in the recent past. The repeated computation with identical operands represents inefficiency in the conventional computational pipeline. In addition, to protect against errors, the compute datapath requires elaborate augmentation via expensive residue code logic. A prior approach to avoiding repeated computations involved an implementation of memoization (an optimization technique making use of look-up tables). A reuse buffer (RB) is used to capture prior computation results and bypass the execution pipeline. However, this approach does not address power and area-efficiency or error tolerance issues. Embodiments of the system and method discussed herein relate to memoization that involves a unified reuse table that dynamically collects reusable instructions, traces (set of instructions), and functions (set of traces) and facilitates data integrity.

Figure 1:
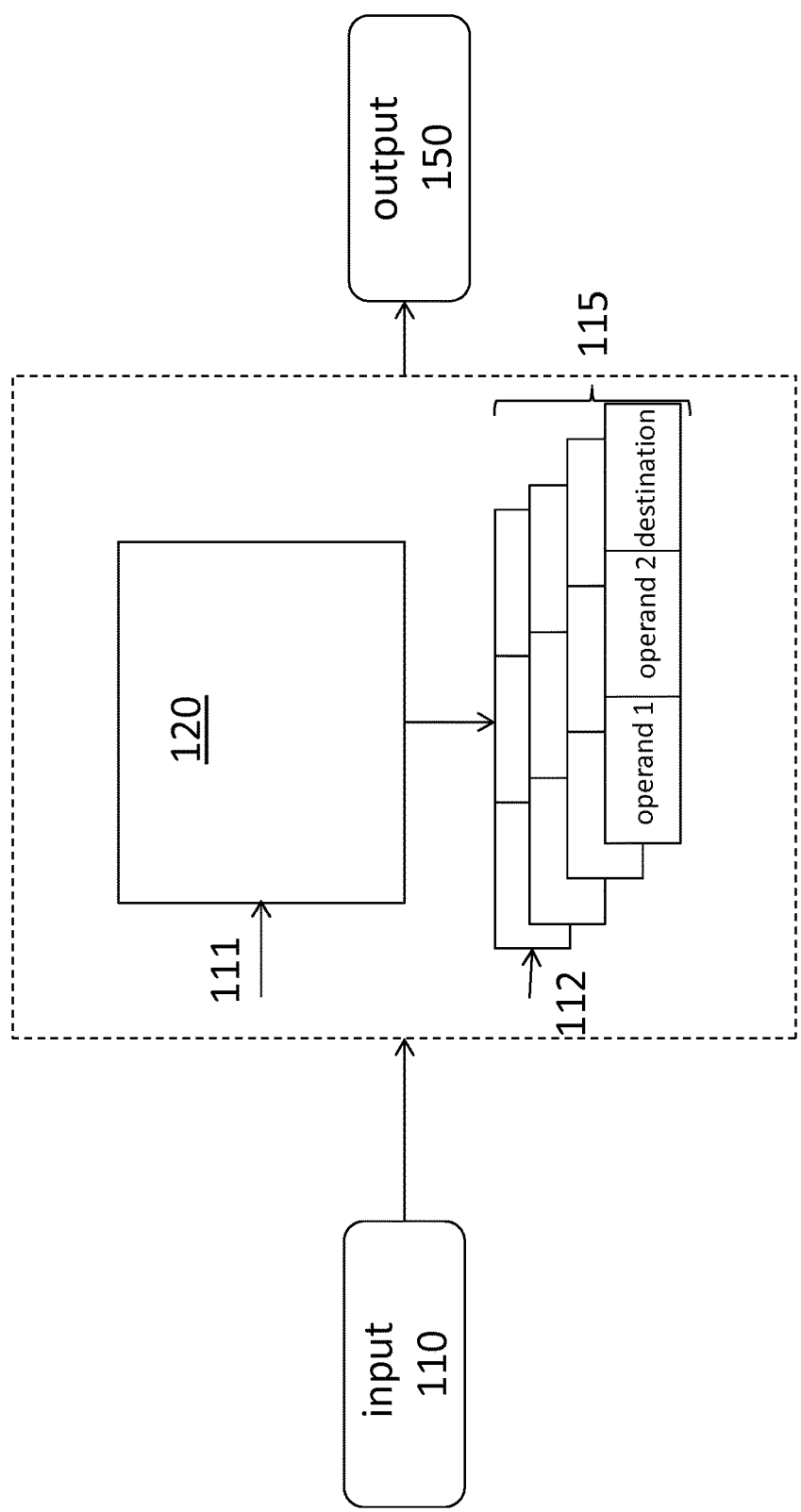
FIG. 1 illustrates aspects of a unified memory table in accordance with embodiments of the invention.

FIG. 1 illustrates aspects of a unified memory table 120 in accordance with embodiments of the invention. The memory table 120 stores computations in the form of instructions, traces (sets of instructions), and functions (sets of traces) as well as results for specific operand values. The memory table 120 is built up based on previously executed computations. Thus, even when the memory table 120 includes an instruction of interest, for example, the memory table 120 may not include the result for that instruction with the specific operand values of interest. Thus, a memory table 120 lookup is a two-step process, and an input 110 to the memory table 120 indicates both the instruction (or trace or function) of interest and the operand values of interest. As one example, for an instruction of A+B that is included in the memory table 120, the memory table 120 includes computation results for A (operand 1)=2 and B (operand 2)=3 but does not include computation results for A=3 and B=5. When an exemplary input 110 identifies the instruction A+B, the match will be found in the memory table 120 (there will be a hit in the memory table 120), but, depending on the operand values specified by the input 110, the memory table 120 may or may not yield an output 150. That is, in the example above, if input 110 specifies A as 2 and B as 3, the memory table 120 provides an output 150 of 5. However, if the input 110 specifies A as 3 and B as 5, the memory table 120 does not provide an output 150 for those operand values.

The first access of the memory table 120, in accordance with the two-step process mentioned above, relates to the computation or computations of interest. As noted above, the input 110 includes an indication of the computation or computations (e.g., instruction, trace, function) of interest. This indication is in the form, for example, of a program counter 111 that acts as an index to the entries in the memory table 120. This first access to the memory table 120 may require multiple cycles if the memory table 120 is large. The number of cycle may be reduced by using a predictor or filter (e.g., bloom filter). One or more matched entries based on the program counter 111 are output to a value buffer 115. Multiple matched entries may be output to the value buffer 115 based on the number of different operand values already stored in the memory table 120 for a given matching computation. Each set of source operands and resulting destination operand stored in the memory table 120 are output to the value buffer 115. Using the example instruction (A+B) discussed above, the program counter 111 would point to the instruction A+B in the memory table 120 and all the currently stored operand values (e.g., A=2, B=3) and corresponding results or destination operands (e.g., 5) would be output to the value buffer 115. The second access of the memory table 120, in accordance with the two-step process mentioned above, relates to the operand values of interest. The operand values 112 specified by the input 110 are searched in the value buffer 115 to ultimately determine if the input 110 will result in an output 150 based on the memory table 120. This second access is guaranteed to be a one-cycle access.

Figure 2:
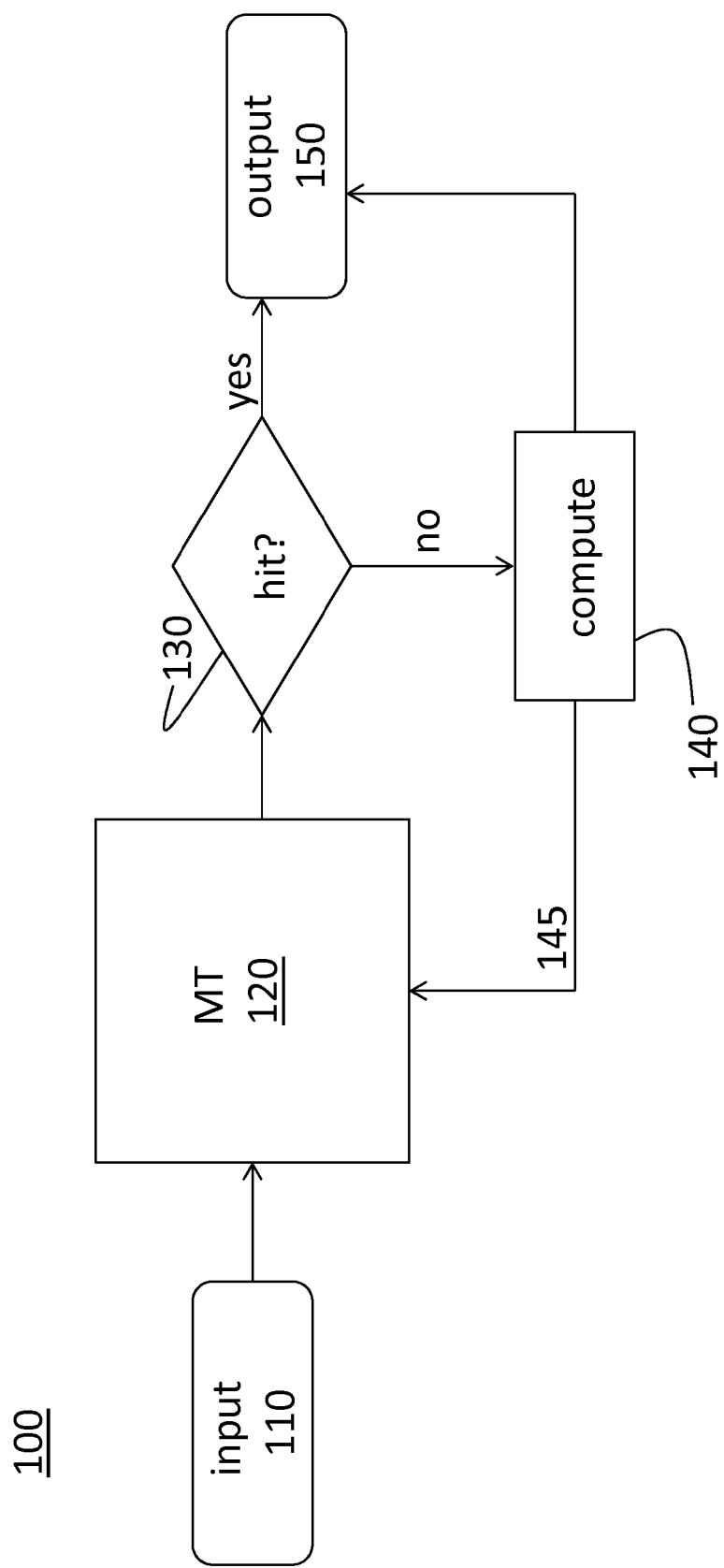
FIG. 2 illustrates a process flow according to an embodiment of the invention.

FIG. 2 illustrates a process flow 100 according to an embodiment of the invention. According to the flow shown in FIG. 2, when the input 110 is matched in the memory table 120 (there is a hit at 130), the result corresponding with the input 110 in the memory table 120 is the output 150. When the input 110 is not matched in the memory table 120 (there is no hit at 130), then a conventional computation is carried out at 140 to generate the output 150. In addition, when the input 110 is not matched in the memory table 120, the output 150 generated by the computation at 140 is added to the memory table 120, as indicated by 145, for subsequent use. Thus, according to the embodiment shown in FIG. 1, the memory table 120 is either used to bypass a computation at 140 or is updated with the output 150 generated by the computation at 140 for every input 110. As the size of the memory table 120 increases, the hit rate (chance of a match with an input 110) increases as well, but so too does the access latency.

Figure 3:
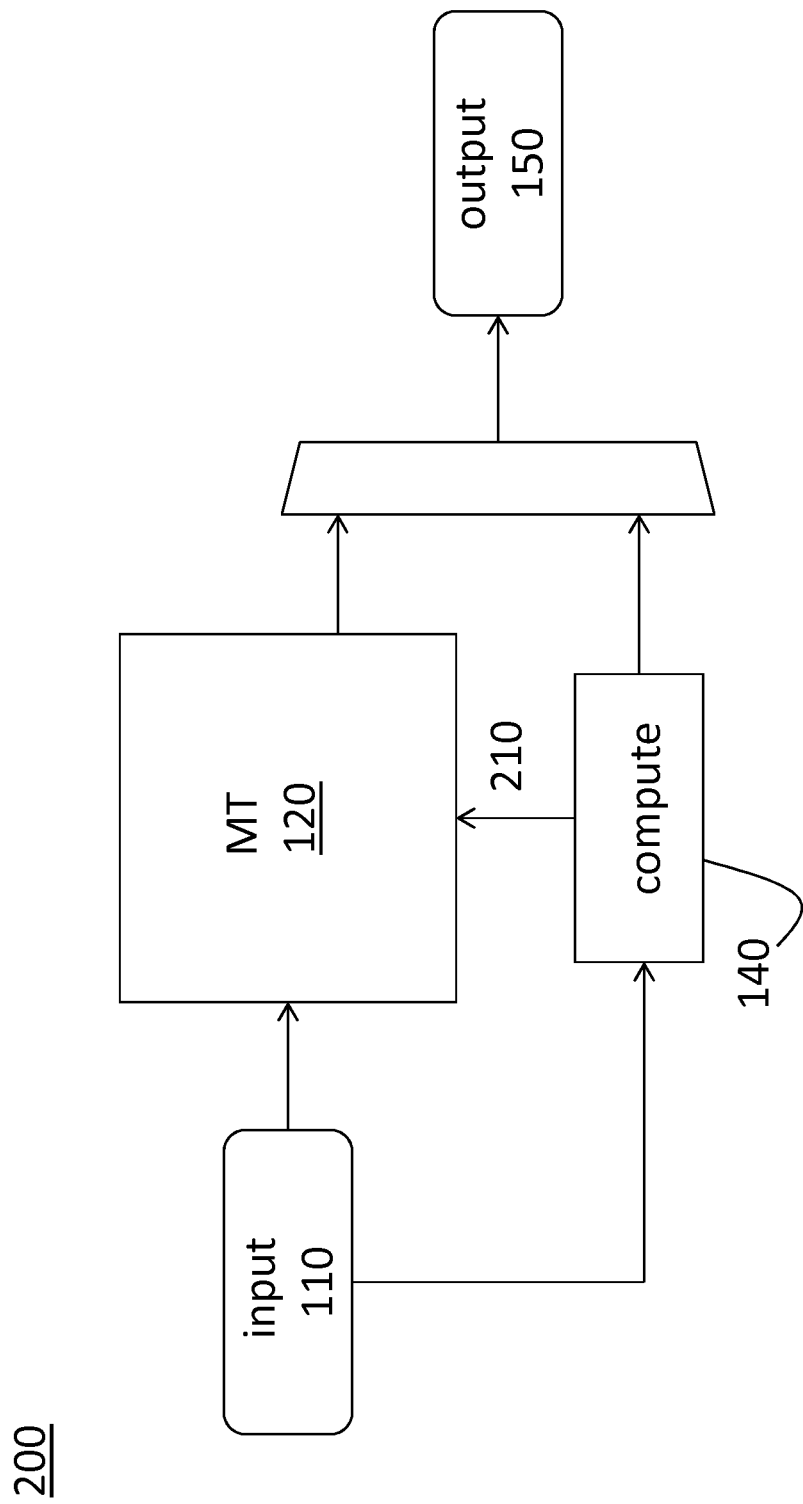
FIG. 3 illustrates a process flow according to another embodiment of the invention.

FIG. 3 illustrates a process flow 200 according to another embodiment of the invention. According to the embodiment shown in FIG. 3, a look-up in the memory table 120 and a computation at 140 are both performed in parallel to generate the output 150. When the input 110 is found in the memory table 120, the output 150 from the memory table 120 and the computation at 140 should be the same. As such, this parallel approach, as compared with bypassing the computation at 140 based on a hit as in the embodiment shown in FIG. 2, may yield better reliability by providing redundancy. However, the resources (energy) required to perform the memory table 120 lookup in parallel with a computation at 140 may be greater than for the approach shown in FIG. 2, in which the computation at 140 is bypassed when the input 110 is found in the memory table 120.

Figure 4:
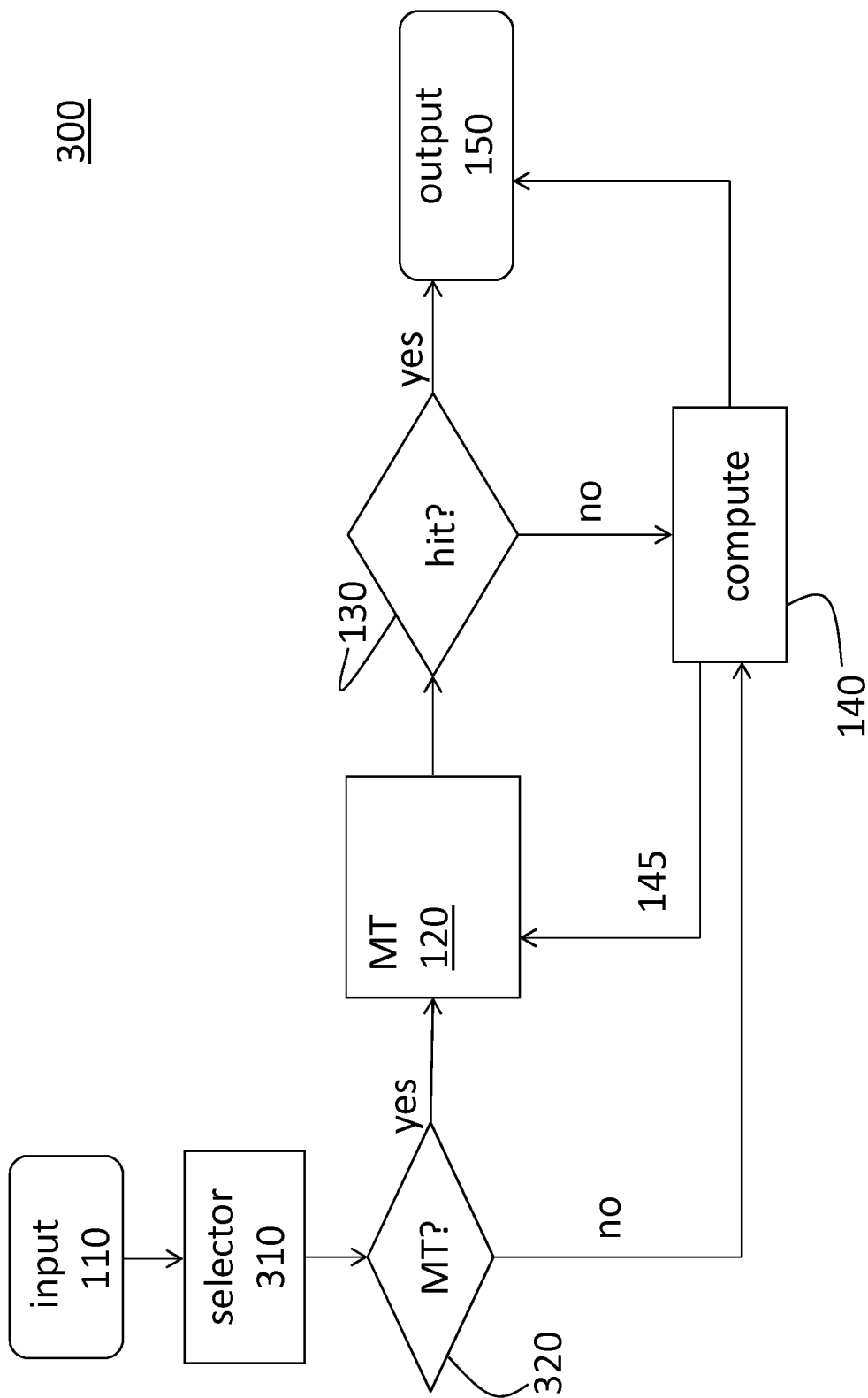
FIG. 4 illustrates a process flow according to yet another embodiment of the invention.
Figure 7:
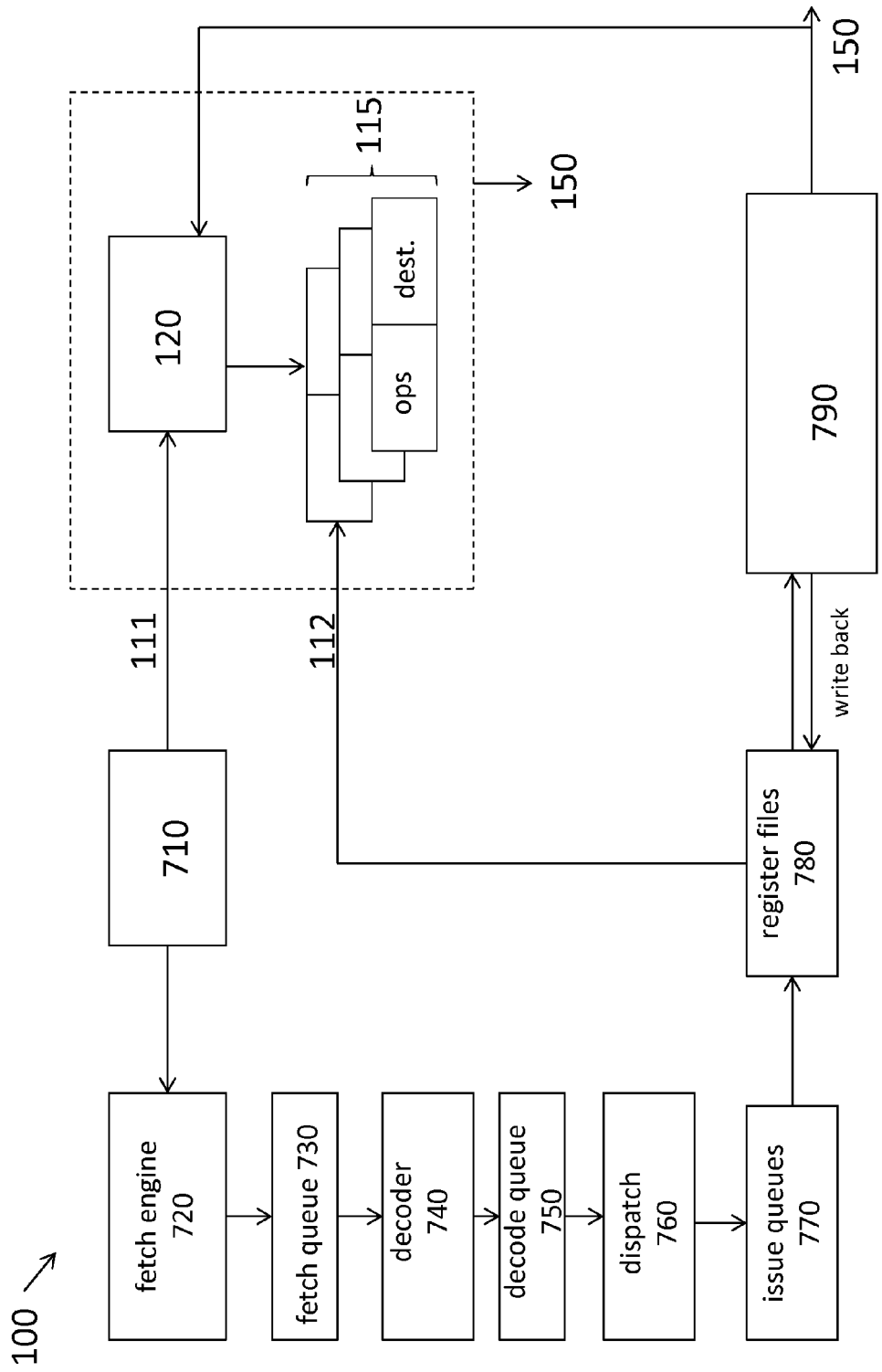
FIG. 7 illustrates integration of a memory table into a processor pipeline according to embodiments of the invention.

FIG. 4 illustrates a process flow 300 according to yet another embodiment of the invention. The embodiment shown in FIG. 4 facilitates a selection between a memory table 120 lookup and a computation at 140. Based on the selector 310, a look-up of the memory table 120 may be bypassed in lieu of computing (140) the output 150. The computation output 150 may also be input to the memory table 120, as shown by 145, to ensure that all performed computations are stored for subsequent memory table 120 lookup. Ideally, the selector 310 would choose to bypass the memory table 120 lookup based on knowing that there will be no hit of the input 110 in the memory table 120. However, because the selector 310 cannot have prior knowledge of whether the input 110 will be matched in the memory table 120 or not, the selector 310 may use one or more factors to decide whether to bypass the memory table 120 lookup or not. One such factor that may affect the selector 310 is the latency of the execution units or functional units 790 (FIG. 7). A relatively short latency may cause the selector 310 to bypass the memory table 120 lookup in favor of performing the computation at 140. Another factor is whether the instruction is speculative and, thus, not a straight-forward lookup. A speculative instruction refers to one that follows unresolved branches or depends on out of order issued loads. The inputs to the speculative instruction may not be correct because, when a branch is mis-predicted or a load needs to be replayed, some of the registers may be overwritten. Another factor is the recent hit rate for the memory table 120. The selector 310 may be more likely to bypass the memory table 120 lookup if the hit rate at 130 has been low. A bloom filter that is updated when an entry is added to the memory table 120 may also be used by the selector 310. This factor illustrates the dynamic nature of the factors that may be used by the selector 310. Because the bloom filter is updated each time an entry is added to the memory table 120, the decision of the selector 310 indicated by the bloom filter may change based on a new entry to the memory table 120. Another factor used by the selector 310 may be the program counter, because some program counter regions may have a higher hit rate in the memory table 120. For example, computations within a loop would have a relatively high hit rate in the memory table 120. Certain instruction types (inputs 110) that have a higher hit rate may also be a factor used by the selector 310. As noted above, one or a combination of several of these factors may be considered in the decision of the selector 310 to bypass or use the memory table 120.

Figure 5:
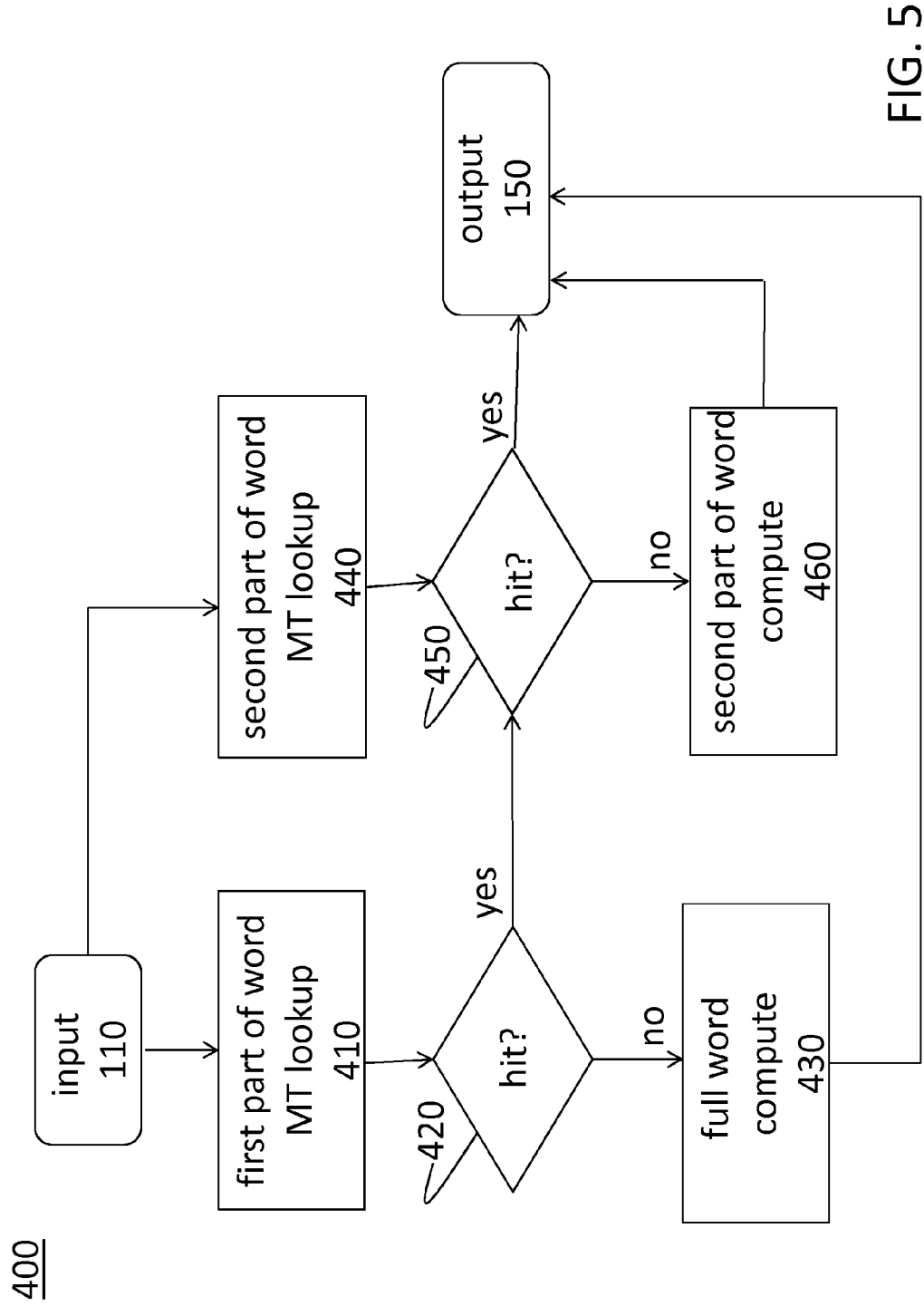
FIG. 5 illustrates a process flow according to yet another embodiment of the invention.

FIG. 5 illustrates a process flow 400 according to yet another embodiment of the invention. The embodiment according to FIG. 5 facilitates partial-matching of an input 110. Partial matching of the input 110 in the memory table 120, as compared to full word matching, increases the possibility of a match. The first and second parts of the word referenced at 410 and 440 may be at any granularity. For example, as shown in FIG. 5, the first part of the word (410) may be the lower half-word, and the second part of the word (440) may be the higher half-word. At 420, if the first part of the word (e.g., lower half-word) does not have a match in the memory table 120, then a computation of the full word (input 110) is done at 430 to provide the output 150. If there is a hit (match) on the first part of the word at 420, it is decided at 450 whether there is a match in the memory table 120 of the second part of the word, as well. If there is a hit at 450, then the memory table 120 provides the output 150.

If there is a hit at 420 but not at 450, then a computation of only the second part of the word is performed at 460 to provide the output 150 that includes a memory table 120 and computation component. As FIG. 5 illustrates, the first and second parts of the word are looked up in the memory table (410, 440) in parallel. However, the partial-matching illustrated by FIG. 5 may instead be done as a serial process.

Figure 6:
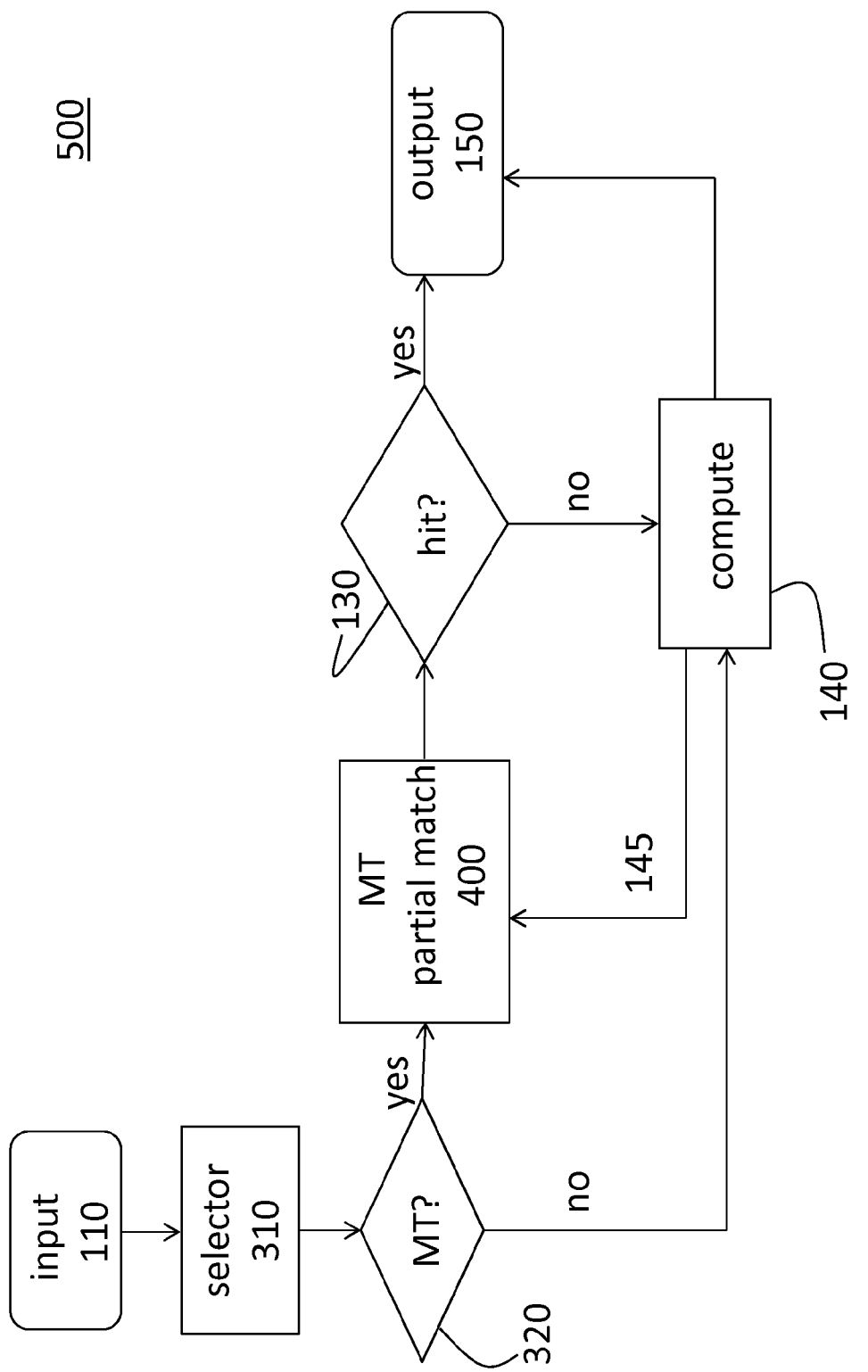
FIG. 6 illustrates the selector triggering a partial-matching process as shown in FIG. 4.

One or more of the embodiments detailed above may be used in combination. For example, the selector 310 discussed with reference to FIG. 4 may be used to perform a memory table 120 look up in parallel (as shown in FIG. 3) or in serial fashion (as shown in FIG. 2). Another example is shown by FIG. 6. FIG. 6 illustrates the selector 310 triggering a partial-matching process 400 as shown in FIG. 5. As discussed with reference to FIG. 4, a selector 310 may use one or more factors to determine whether or not to bypass the memory table 120 lookup. Based on the determination by the selector 310, at 320 the input 110 is either sent for the partial-match process 400 or for computation at 140 to generate the output 150.

FIG. 7 illustrates integration of a memory table 120 into a processor 100 pipeline according to embodiments of the invention. In the embodiment shown in FIG. 7, the input 110 indicates that the computation of interest is an instruction. Program counter logic 710 includes the address for all possible instructions and produces the program counter 111, discussed with reference to FIG. 1, which represents the index to the instruction of interest in the memory table 120. The program counter logic 710 output is used by the fetch engine 720 to fetch the instruction of interest and put it in the fetch queue 730. The decoder 740 decodes the instruction fetched by the fetch engine 720 (e.g., indexes the operand by register name) and puts the decoded instruction in the decode queue 750. The dispatch unit 760 determines the particular issue queue 770 in which to put the instruction and the register files 780 output the actual operand values 112 specified by the input 110 based on the decoder 740. The operand values 112 are used to determine if the value buffer 115, generated by the memory table 120 based on a match of the instruction of interest (indicated by the program counter 111), includes the operand values 112 of interest. If so, the output 150 may be obtained from the memory table 120. If not, the functional units 790 not only generate the output 150 but also send the output 150 to the reuse buffer in the memory table 120.

Figure 8:
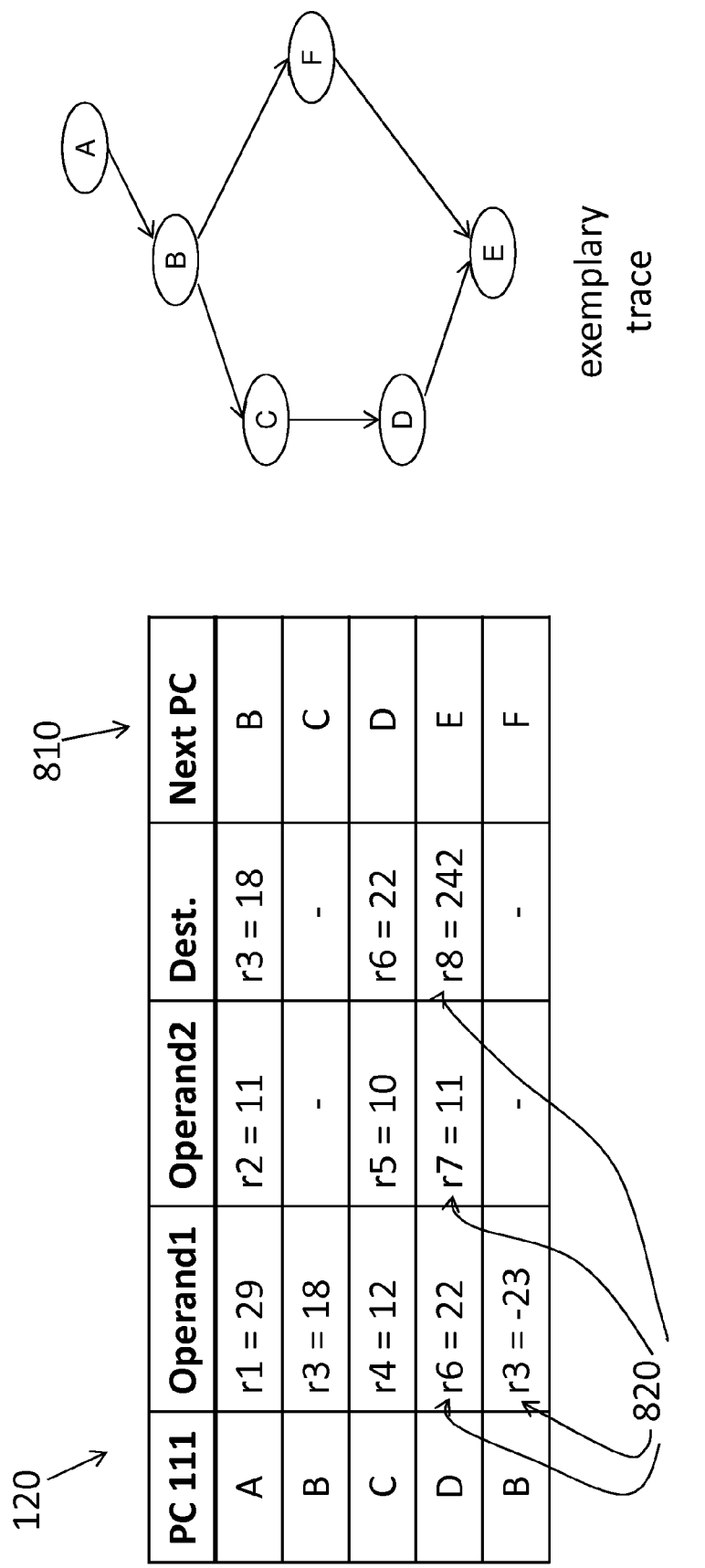
FIG. 8 illustrates exemplary instructions and a corresponding memory table according to an embodiment of the invention.

FIG. 8 illustrates exemplary instructions and a corresponding memory table 120 according to an embodiment of the invention. When a trace or function, rather than a single instruction, is of interest, the same unified memory table 120 may still be used as detailed below. The exemplary instructions (A, B, C, D, E, F) shown in FIG. 8 include two traces (A→B→C→D→E and A→B→F→E) indicated by the arrows. The corresponding memory table 120 includes a "Next PC" column indicating the next program counter 810 in the trace and register names 820 or identifiers (IDs) in addition to operand values (e.g., r1=29 rather than only the operand value 29). In this way, as further discussed with reference to FIGS. 9 and 10, the next instruction in a trace need not be fetched (one instruction at a time) by the fetch engine 720 but, instead, when the operand values 112 (FIGS. 1, 7) match the value buffer 115 (FIGS. 1, 7), the branch (trace segment) may be resolved through memory table 120 lookup.

Figure 9:
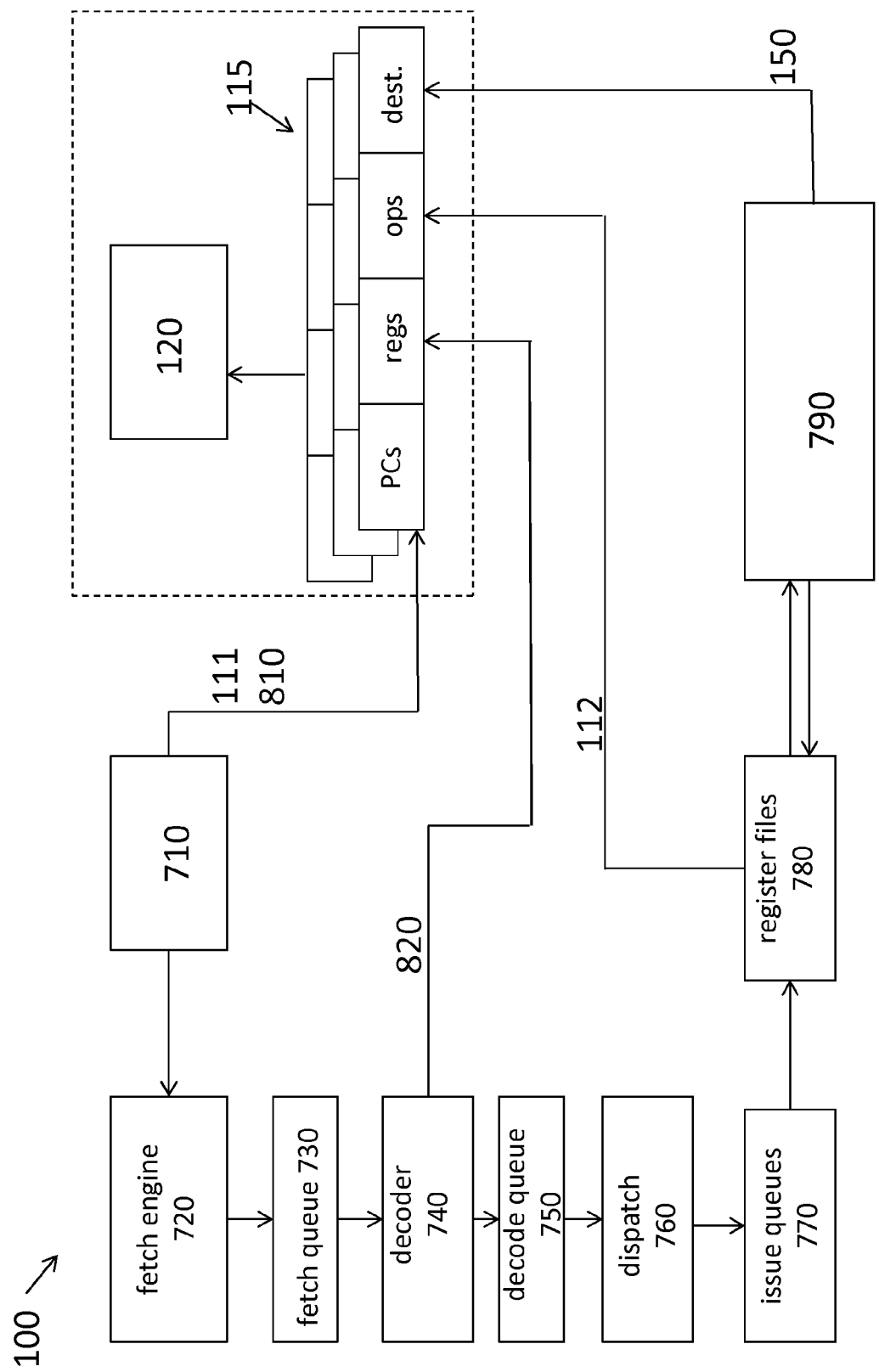
FIG. 9 illustrates dynamic trace collection by the memory table in a processor pipeline according to an embodiment of the invention.

FIG. 9 illustrates dynamic trace collection by the memory table 120 in a processor 100 pipeline according to an embodiment of the invention. The program counter logic 710 provides both the program counter 111 for the desired instruction and the next program counter 810 in the trace to the value buffer 115. Both the current program counter 111 and next program counter 810 are stored in the value buffer 115 (PCs). The instructions associated with the program counters 111, 810 are fetched (720) and the decoder 740 indexes the corresponding operands by register name (provides the register names 820) to the value buffer 115 (regs). The register files 780 provide the operand values 112 associated with the register names 820 to the value buffer 115 (ops). The computation outputs 150 (for the multiple instructions identified by the program counters 111, 810) are determined by the functional units 790 and provided to the value buffer 115 for inclusion as the destination operand (dest). For a trace including several instructions, one or more of the instructions associated with the next program counter 810 will themselves include a next program counter 810. Thus, the value buffer 115 may include more than two program counters (PCs) and associated register names 820, operand values 112, and results or destination operands 150 as a trace entry in the memory table 120. Also, because a function is a set of traces, this same procedure for populating the memory table 120 could be used. The dynamic trace collection procedure illustrated by FIG. 9, which shows the collection of instruction level information to form a trace, may be performed periodically (e.g., every 1,000 instructions).

Figure 10:
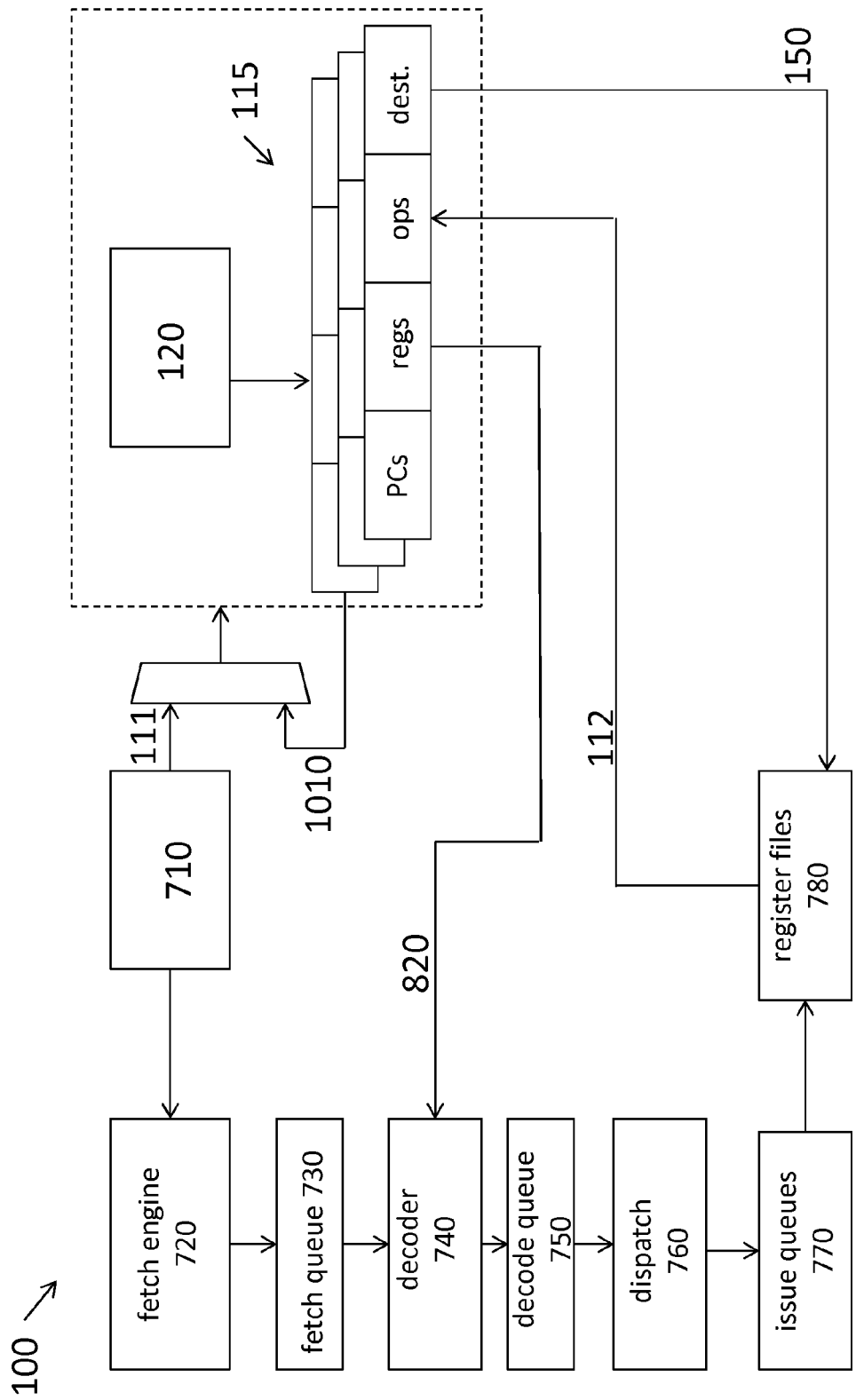
FIG. 10 illustrates reuse of an instruction that is part of the trace collection shown in FIG. 9.

FIG. 10 illustrates reuse of an instruction that is part of the trace collection shown in FIG. 9. That is, the instructions collected (e.g., as shown in the value buffer 115 of FIG. 9) to form a trace may be reused. Program counter logic 710 outputs the program counter 111 (as in FIG. 7) as an input to the memory table 120, and the program counter 1010 from the last instruction entry into the trace collection value buffer 115 is also input to the memory table 120. The register names 820 (for the instruction of interest indicated to the memory table 120) are used to obtain operand values 112 from the register files 780, and if a destination operand is associated with those operand values 112, an output 150 is written back to the register files 780. While the dynamic trace collection (FIG. 9) and instruction reuse during trace collection (FIG. 10) are shown in and discussed with reference to two separate figures, the two processes may be performed simultaneously. In alternate embodiments, a collection phase, in which trace collection is performed according to FIG. 9, may be alternated with a reuse phase, in which instructions collected for trace reuse are performed through a memory table 120 lookup according to FIG. 10.

Figure 11:
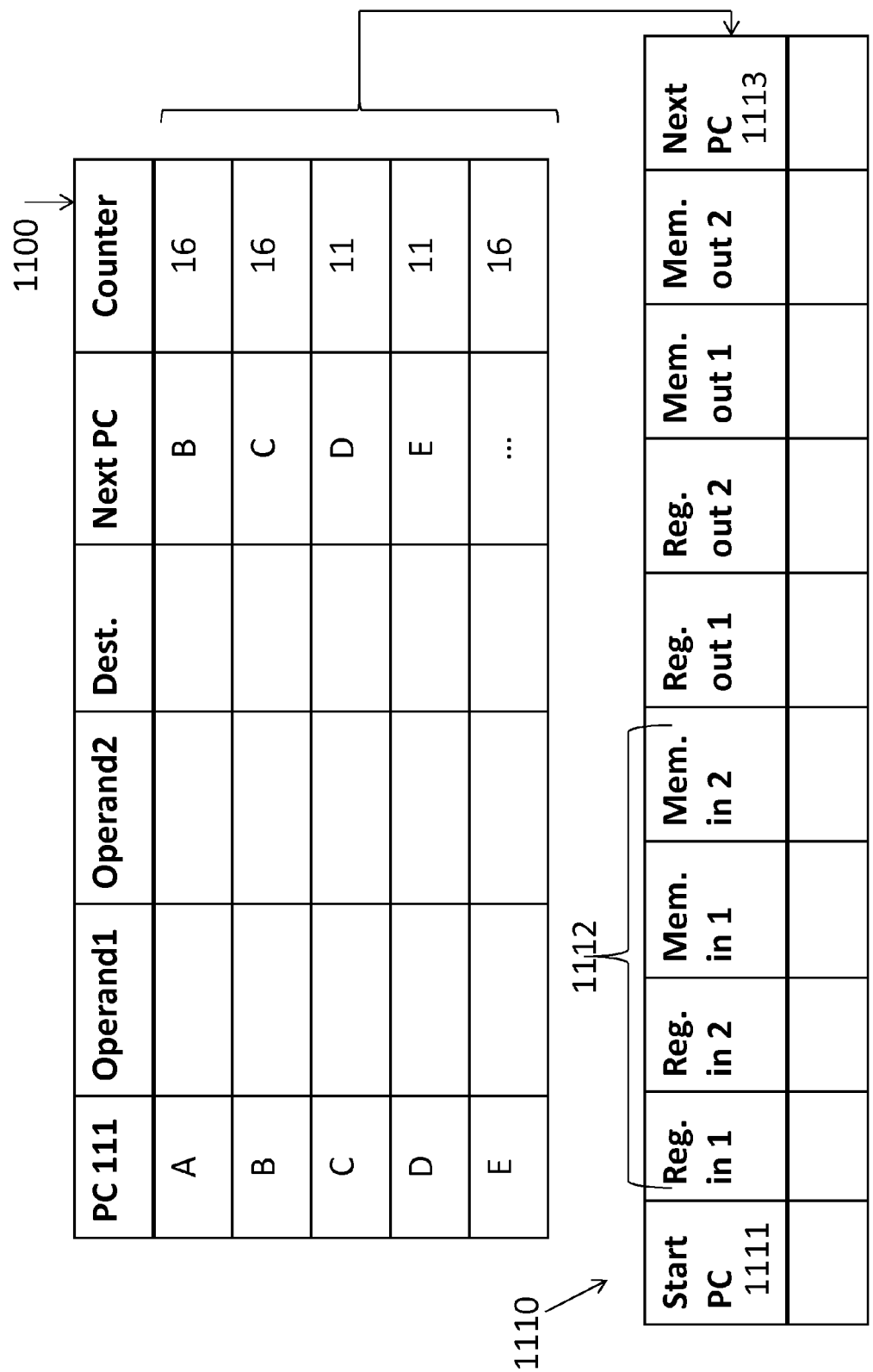
FIG. 11 illustrates the formation of a trace based on collected instructions according to an embodiment of the invention.

FIG. 11 illustrates the formation of a trace based on collected instructions according to an embodiment of the invention. As noted above, instructions from a trace collection table may be used to form traces periodically. As FIG. 11 illustrates, a counter 1100, which indicates the popularity of each instruction, may be added to each trace collection entry. The counter 1100 aids in determining which instructions should be added to a trace reuse table 1110. Each trace reuse table 1110 entry is larger than an instruction reuse entry (see e.g., an entry in the value buffer 115 in FIG. 9). Thus, including every instruction in a trace within the trace reuse table 1110 may not be feasible and factors such as the counter 1100 may ensure efficient use of the trace reuse table 1110 space. Once the trace reuse table 1110 is formed, reuse of a trace is similar to the reuse of an instruction (see e.g., FIGS. 7 and 10). When the program counter 111 input to the memory table 120 corresponds with the program counter of the first instruction in a trace (1111) and all the required inputs (1112), then the subsequent instructions in the trace need not be individually entered (via an input generating the program counter 111) to the memory table 120 one-by-one. Instead, the program counter logic 710 sends the next program counter (1113) from the reuse table 1110 to fetch the next instruction after the trace. For function (set of traces) reuse, potentially reusable functions are identified at compile time, and entries of the identified functions are stored in a trace reuse table at the program load time. The values may be populated at runtime. The first instructions of the potentially reusable functions may be tagged such that when a tagged instruction is encountered at runtime, the trace reuse table is accessed and the required input values are obtained, according to the pre-installed entry, for comparison with entered values. When the values match, then the trace reuse table is used. When the values do not match or do not exist in the trace reuse table, then the trace reuse table may be updated. The tag identifying the first instructions of potentially reusable functions may be encoded in extended instruction set architecture or may be stored in association with the program counter 111 in the memory table 120. According to an exemplary embodiment, each entry of the reuse table may be augmented with an additional bit that indicates whether the entry is a reusable function.

The memory table 120 may be implemented according to a number of embodiments. The system that incorporates the memory table 120 includes one or more memory devices, one or more processors, and an input and an output interface. Static random-access memory (SRAM) has been used to build look-up tables and provides high-speed lookup but may consume more power relative to other implementations. Non-volatile memory (NVM) technologies provide high-speed access at lower power than many other potential implementations for the memory table 120. Embodiments using NVM include those implementing a memory table 120 using spin-transfer torque magnetoresistive random-access memory (STT-MRAM) and resistive random-access memory (ReRAM). The persistent memory properties of these technologies may be used to retain learning across context switches and make them immune to transient faults. Both content-addressable memory (CAM) and random-access memory (RAM) is facilitated by resistive memories. Parity, error correction coding (ECC), or other coding techniques may be used for other types of errors (write errors or hard errors due to limited lifetime) to improve the reliability of the memory array. Three-dimensional integration of the memory table 120, creating a memory table 120 layer separate from a processor core layer of a multi-layer circuit that is integrated horizontally and vertically, may reduce access latency. Any of the memory technology embodiments discussed above may be used and need not be compatible with the core logic technologies. In addition, for embodiments in which either the logic (functional units 790) or the memory table 120 is used (not both in parallel), the power density of the chip is not increased through the addition of the memory table 120. By using virtual memory (physical memory space of the processing system) to store some or all of the memory table 120, the total amount of reuse information is not limited by the size of the reuse buffer. Virtualization of the memory table 120 may be useful when multiple applications are executed concurrently, for example. Traditional cache hierarchy may be used to load the reuse buffer entries back from the dedicated physical memory space. Also, pre-fetch algorithms may be developed to pre-load the on-chip reuse buffer with reuse information prior to processing.

Figure 12:
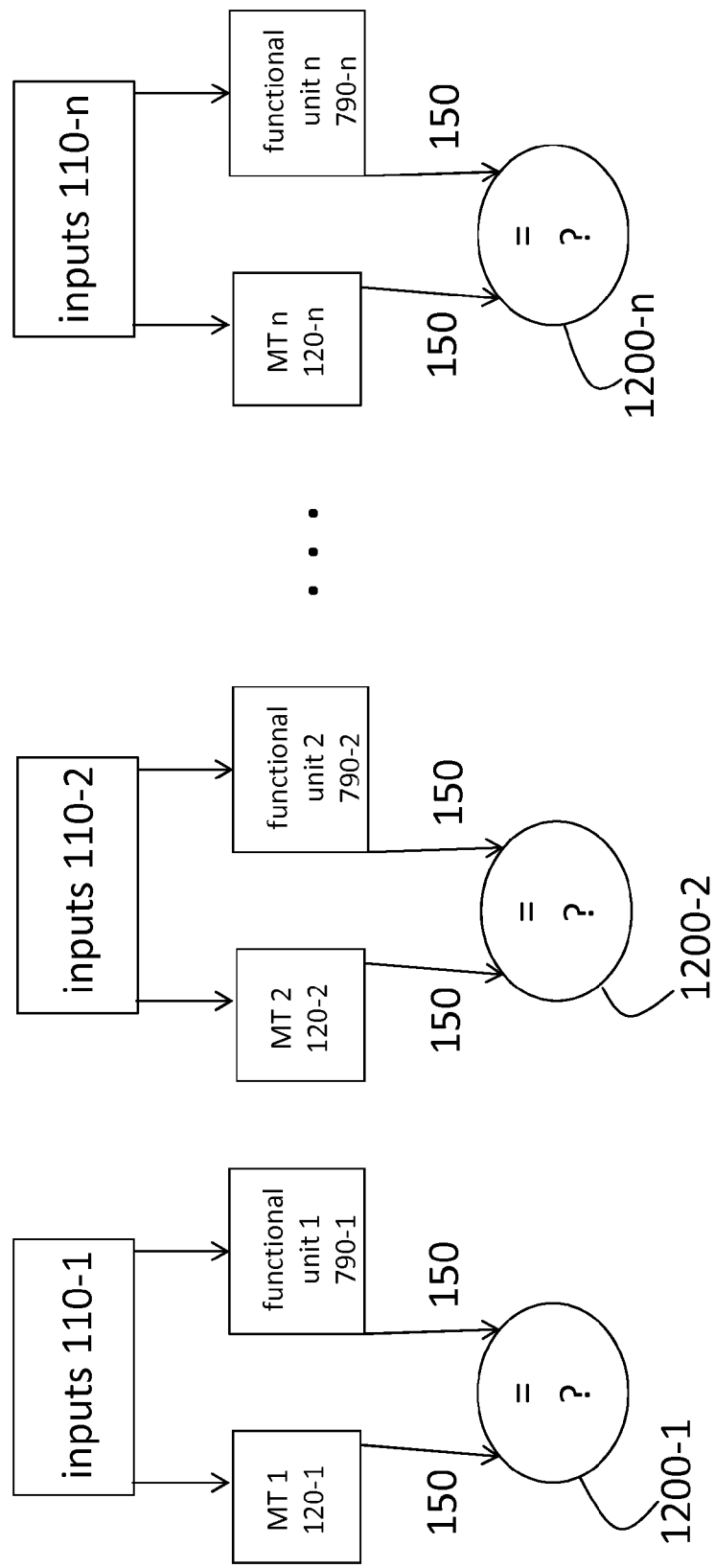
FIG. 12 illustrates a distributed arrangement of the memory table 120 according to an embodiment of the invention.

As noted above, the unified memory table 120 according to embodiments of the invention facilitates data integrity. FIG. 12 illustrates a distributed arrangement of the memory table 120 according to an embodiment of the invention. The memory table 120 is distributed to be close to each functional unit 790. Memory table 120 access and functional unit 790 execution are done in parallel, and the output 150 produced by each is compared at 1200. When the two outputs do not match, a fault is indicated. For example, when the output 150 from the memory table 120-1 is not the same as the output 150 produced by the functional unit 790-1, then the functional unit 790-1 includes a fault. The memory table 120 may be backed up with a full truth table, which stores every combination of input 110 and output 150. The full truth table facilitates a smaller granularity in the partial-matching embodiment discussed with reference to FIG. 5.

Management of the unified memory table 120 is discussed below. Management refers to the insertion and eviction policies applied to entries in the memory table 120. Management ensures efficient use of the memory dedicated to the memory table 120. The management procedures may be done periodically, based on processing events, or as a combination of the two. The policies may be based on different factors according to different embodiments. For example, the policies may be based on the type of computation such that only long-latency and complex computations or only frequently reused instructions are stored in the memory table 120. As another example, the policies may be program counter 111 based such that only instructions in the frequently reused program counter region are added to the memory table 120. The number of entries in the memory table 120 per program counter may be constrained. As yet another example, when an additional bit is used in the reuse table to indicate whether an entry is a function, as discussed for the exemplary embodiment above, an entry whose bit identifies it as a reusable function may preferentially be retained (instead of a trace, for example). Any combination of the types of policies may be used, as well. Policies may vary based on the phase of operation. As such, detection of the phase of operation may be performed periodically. The reused instructions for different types of computations and program counter regions may be counted periodically and used to change the insertion and eviction preferences.

According to one embodiment, a memory table 120 may be maintained for each type of functional unit 790 (e.g., floating point, fixed point). Each entry of the memory table 120 may have a k-bit saturating counter, initialized to $2^k-1$, to track the use of the entry. An additional predictor may be maintained within the memory table 120 for each functional unit 790 and may be indexed by the corresponding program counter. Each entry of the predictor memory table 120 may have an n-bit saturating counter initialized to $2^n-1$. Each time an instruction used the memory table 120, the counter would be incremented by 1. When the memory table 120 was not used instead of pipeline logic, the counter would be decremented by 1. When the counter is greater than $2^n-1$, the usefulness counter for the corresponding computation entry in the memory table 120 is incremented by 1, and when the counter is less than $2^n-1$, the usefulness counter for the corresponding entry in the memory table 120 is decremented by 1. Any entry in the memory table 120 with a usefulness counter that is less than $2^k-1$ may be deemed a candidate for replacement (eviction). In an alternate embodiment, a k-bit saturating counter may be used per entry of the memory table 120 to track usefulness. This counter may be initialized to 0. Each time an instruction uses the entry in the memory table 120, the counter is incremented. If the last program counter is different from the current program counter accessing the same memory table 120 entry, the counter is incremented again. When the count for an entry of the memory table 120 reaches $2^k-1$, the counts corresponding to all the entries are halved, and entries with counts of 0 are candidates for replacement.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method implemented by a processor to obtain computation results, the method comprising:
   storing, in a unified reuse table, a plurality of entries that include both single instructions and a set of instructions of a trace, each entry of the plurality of the entries corresponding with a computation instruction and including values of operands of the computation instruction and an output of the computation instruction, and, based on the computation instruction being one of the set of instructions of the trace, an indication of a subsequent instruction in the trace, wherein based on the computation instruction being one of the set of instructions of the trace, in at least one of the plurality of entries, the values of the operands include the output of a previous computation instruction that is a previous instruction of the set of instructions of the trace;
   performing a computation, using a functional unit, based on a corresponding instruction; and
   obtaining a result associated with an input based on either or both of the unified reuse table and the functional unit.

2. The method according to claim 1, further comprising storing the corresponding instruction and a result of the computation performed by the functional unit in the unified reuse table as a new entry.

3. The method according to claim 1, further comprising the functional unit performing a set of computations corresponding with the set of instructions of the trace and storing the set of instructions and results of the set of computations in the unified reuse table as new entries, each new entry comprising the names corresponding with the values of operands of the corresponding instruction among the set of instructions and the indication of the subsequent instruction in the set of instructions.

4. The method according to claim 1, wherein the obtaining the result of the input includes obtaining the result from an entry among the plurality of entries of the unified reuse table corresponding with the input instead of from the functional unit.

5. The method according to claim 1, wherein the obtaining the result of the input includes obtaining a first result associated with the input from the unified reuse table in parallel with obtaining a second result by performing an input computation corresponding with the input using the functional unit.

6. The method according to claim 5, further comprising verifying the functional unit by comparing the first result with the second result, wherein when the first result and the second result are not equal, a fault is indicated in the functional unit.

7. The method according to claim 1, further comprising implementing processor logic to select whether an input will be searched among the plurality of entries of the unified reuse table.

8. The method according to claim 1, further comprising searching among the plurality of entries of the unified reuse table using an input word divided into a first partial word and a second partial word, wherein the searching for each of the first partial word and the second partial word is performed in parallel or serially.

9. The method according to claim 1, wherein the unified reuse table is implemented as resistive memory.

10. The method according to claim 1, further comprising forming the processor as a three-dimensional integrated circuit and implementing the unified reuse table on a first layer and forming the functional unit on a second layer.

11. The method according to claim 1, wherein each entry of the plurality of entries includes an identifier indicating whether the entry is a function, the function being a set of traces and each trace of the set of traces being a set of computation instructions.

12. The method according to claim 11, further comprising managing the unified reuse table based on an eviction and retention policy.

13. The method according to claim 12, further comprising retaining an entry of the plurality of entries based on the policy when the identifier of the entry indicates that the entry is a function.

* * * * *